(12) United States Patent
Nammi et al.

(10) Patent No.: US 10,659,270 B2
(45) Date of Patent: May 19, 2020

(54) MAPPING REFERENCE SIGNALS IN WIRELESS COMMUNICATION SYSTEMS TO AVOID REPETITION

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/156,710

(22) Filed: Oct. 10, 2018

(65) Prior Publication Data
US 2020/0119962 A1    Apr. 16, 2020

(51) Int. Cl.
*H04L 27/26*    (2006.01)
*H04L 5/00*    (2006.01)

(52) U.S. Cl.
CPC ........ *H04L 27/2626* (2013.01); *H04L 5/0048* (2013.01); *H04L 27/2614* (2013.01)

(58) Field of Classification Search
CPC ............. H04L 27/2626; H04L 27/2614; H04L 5/0048
See application file for complete search history.

(56) References Cited

U.S. PATENT DOCUMENTS

| | | |
|---|---|---|
| 5,991,262 A | 11/1999 | Laird et al. |
| 6,125,103 A | 9/2000 | Bauml et al. |
| 6,128,350 A | 10/2000 | Shastri et al. |

(Continued)

FOREIGN PATENT DOCUMENTS

| | | |
|---|---|---|
| CN | 107046513 A | 8/2017 |
| EP | 2264937 A2 | 12/2010 |

(Continued)

OTHER PUBLICATIONS

Lin, Xingqin, et al. "5G New Radio: Unveiling the Essentials of the Next Generation Wireless Access Technology." arXiv preprint arXiv: 1806.06898 (2018). 8 pages. https://arxiv.org/pdf/1806.06898.

(Continued)

*Primary Examiner* — Jean B Corrielus

(74) *Attorney, Agent, or Firm* — Amin, Turocy & Watson, LLP

(57) ABSTRACT

The described technology is generally directed towards having a transmitter in a wireless network generate and map reference signal sequences (e.g., for demodulation or other reference signal usage) so that the reference signal sequences are non-repetitive in a resource block. Avoiding repetition of the reference signal sequences reduces the peak-to-average power ratio in orthogonal frequency-division multiplexing (OFDM) systems. In one aspect, a transmitter device generates different reference signal sequences to avoid repetition of resource signal sequences, and maps the different reference signal sequences to appropriate (different) resource elements of a resource block. In one implementation, the different reference signal sequences can be based on different indexes of antenna ports. In an alternative implementation, the different reference signal sequences can be based on different code division multiplexing groups.

20 Claims, 11 Drawing Sheets

(56) References Cited

U.S. PATENT DOCUMENTS

| | | | |
|---|---|---|---|
| 7,266,156 B2 | 9/2007 | Montojo et al. | |
| 7,340,006 B2 | 3/2008 | Yun et al. | |
| 7,418,041 B2 | 8/2008 | Jung et al. | |
| 7,583,583 B2 | 9/2009 | Guo et al. | |
| 7,839,947 B2 | 11/2010 | Clausen et al. | |
| 8,135,081 B2 | 3/2012 | Moffatt et al. | |
| 8,213,293 B2 | 7/2012 | Lee et al. | |
| 8,358,711 B2 | 1/2013 | Marsili | |
| 8,472,537 B2 | 6/2013 | Browning et al. | |
| 8,571,000 B2 | 10/2013 | Zhou et al. | |
| 8,774,258 B2 | 7/2014 | Tadano | |
| 8,798,181 B1 | 8/2014 | Terry | |
| 8,824,574 B2 | 9/2014 | McCallister et al. | |
| 9,363,736 B2 | 6/2016 | Griot et al. | |
| 9,503,301 B2 | 11/2016 | Dick | |
| 9,544,160 B2 | 1/2017 | Kim et al. | |
| 9,577,779 B2 | 2/2017 | Vilaipornsawai et al. | |
| 9,635,529 B2 | 4/2017 | Kruglick et al. | |
| 9,641,373 B2 | 5/2017 | Zeng et al. | |
| 9,848,410 B2 | 12/2017 | Ouchi et al. | |
| 9,877,254 B2 | 1/2018 | Gholmieh et al. | |
| 9,893,919 B2 | 2/2018 | Kim et al. | |
| 10,051,654 B2 | 8/2018 | Tooher et al. | |
| 2002/0168016 A1 | 11/2002 | Wang et al. | |
| 2007/0071120 A1 | 3/2007 | Talwar | |
| 2010/0272040 A1* | 10/2010 | Nam | H04J 13/0077 370/329 |
| 2011/0038344 A1* | 2/2011 | Chmiel | H04W 48/08 370/330 |
| 2011/0075651 A1 | 3/2011 | Jia et al. | |
| 2011/0228877 A1* | 9/2011 | Han | H04L 5/0007 375/295 |
| 2011/0249767 A1 | 10/2011 | Chen et al. | |
| 2012/0106610 A1* | 5/2012 | Nogami | H04B 7/024 375/224 |
| 2013/0077660 A1* | 3/2013 | Ko | H04B 7/0639 375/219 |
| 2013/0114536 A1 | 5/2013 | Yoon | |
| 2015/0304153 A1 | 10/2015 | Moffatt et al. | |
| 2016/0173255 A1 | 6/2016 | Lee et al. | |
| 2017/0237592 A1 | 8/2017 | Yang et al. | |
| 2017/0310442 A1 | 10/2017 | Noh et al. | |
| 2018/0026684 A1 | 1/2018 | Wei et al. | |
| 2018/0115331 A1 | 4/2018 | Lange et al. | |
| 2018/0123747 A1 | 5/2018 | Wang et al. | |
| 2018/0131418 A1 | 5/2018 | Wang et al. | |
| 2018/0131485 A1 | 5/2018 | Wang et al. | |
| 2018/0198657 A1* | 7/2018 | Aiba | H04W 72/042 |
| 2018/0198668 A1 | 7/2018 | Kim et al. | |
| 2018/0205586 A1 | 7/2018 | Park et al. | |
| 2018/0234223 A1* | 8/2018 | Nakao | H04B 7/0413 |
| 2018/0234277 A1 | 8/2018 | Akkarakaran et al. | |
| 2018/0241603 A1 | 8/2018 | Jia et al. | |
| 2018/0254867 A1* | 9/2018 | Kim | H04B 7/0452 |
| 2018/0278396 A1* | 9/2018 | Yang | H04L 27/2611 |
| 2018/0287680 A1* | 10/2018 | Xu | H04B 7/06 |
| 2018/0302905 A1 | 10/2018 | Fodor et al. | |
| 2018/0316469 A1 | 11/2018 | Jiang et al. | |
| 2018/0324005 A1 | 11/2018 | Kim et al. | |
| 2018/0324787 A1 | 11/2018 | Yin et al. | |
| 2019/0165913 A1* | 5/2019 | He | H04L 5/0048 |
| 2019/0215119 A1 | 7/2019 | Kim et al. | |

FOREIGN PATENT DOCUMENTS

| | | |
|---|---|---|
| WO | 2018081107 A1 | 6/2015 |
| WO | 2016174165 A2 | 11/2016 |
| WO | 2017121390 A1 | 7/2017 |
| WO | 2018/049035 A1 | 3/2018 |
| WO | 2018060969 A1 | 4/2018 |

OTHER PUBLICATIONS

Molano Ramos, Juan Sebastian, et al. "New Radio Interfaces Beyond 4G." Politecnico di Torino, 2018. 53 pages. https://webthesis.biblio.polito.it/7611/1/tesi.pdf.

Guo, Jiabing. "Design and implementation of LTE-A and 5G kernel algorithms on SIMD vector processor." KTH Royal Institute of Technology (2015). 83 pages. http://www.diva-portal.org/smash/get/diva2 : 785081/FULLTEXT0 1. pdf.

Elsaadany, Mahmoud, et al. "Cellular LTE-A Technologies for the Future Internet-of-Things: Physical Layer Features and Challenges." IEEE Communications Surveys & Tutorials 19.4 (2017): 2544-2572. 28 pages. https://fardapaper. ir/mohavaha/uploads/2017 /10/Cellular-LTE-ATechnologies.pdf.

Lin, et al., "5G New Radio: Unveiling the Essentials of the Next Generation Wireless Access Technology," arXiv preprint rXiv:1806.06898 (2018), 8 pages.

Non-Final Office Action received for U.S. Appl. No. 16/144,646 dated Nov. 19, 2019, 33 pages.

International Search Report and Written Opinion received for PCT Application Serial No. PCT/US2019/047584 dated Dec. 9, 2019, 42 pages.

Ericsson: "Benefits of resource specific DMRS mapping",URL : http://www.3gpp.org/ftp/Meetings%5F3GPP% 5FSYNC/RAN1/Docs/, vol No. Busan, May 20, 2018, 4 pages.

Ericsson: "On high PAPR in rank 2 transmissions with FDM of DMRS ports"URL:http://www.3gpp.org/ftp/Meetings%5F3GPP% 5FSVNC/RAN1/Docs/vol. RAN WG1, No. Busan, Korea, May 20, 2018, 2 pages.

Ericsson: "On correlation of DMRS Gold sequences",URL:http://www.3gpp.org/ftp/Meetings%5F3GPP%5FSYNC/ RAN1/Docs/vol. RAN WG1, No. Busan, Korea, May 20, 2018, 4 pages.

International Search Report and Written Opinion received for PCT Application Serial No. PCT/US2019/054810 dated Jan. 20, 2020, 15 pages.

International Search Report and Written Opinion received for PCT Application Serial No. PCT/US2019/058984 dated Feb. 17, 2020, 13 pages.

Ericsson: "On specification-based solutions the DMRS PAPR issue", 3GPP Draft; R1-1811542 on Specification-Based Solutions to the DMRS PAPR Issue, 3rd Generation Partnership Project (3GPP), Mobile Competence Centre; 650, Route Des Lucioles; F-06921 Sophia—Antipolis, vol. RAN WG1, No. Chengdu, China; Oct. 8, 2018-Oct. 12, 2018 Sep. 2018 (Sep. 29, 2018), XP051518942, Retrieved from the Internet: URL: http://www.3gpp.org/ftp/tsg%5Fran/WG1%5FRL1/TSGR1%5F94b/Docs/R1%.

\* cited by examiner

MAPPING REFERENCE SIGNALS IN WIRELESS COMMUNICATION SYSTEMS TO AVOID REPETITION

TECHNICAL FIELD

The subject application is related to wireless communication systems, and, for example, to the transmission of reference signals in an orthogonal frequency-division multiplexing (OFDM) wireless communication system.

BACKGROUND

In wireless communication systems, including New Radio (NR, sometimes referred to as 5G) and likely beyond, user equipment computes channel estimates based on pilot or reference signals. For example, downlink reference signals are predefined signals occupying specific resource elements within the downlink time-frequency grid. There are different types of downlink reference signals that are transmitted in different ways and used for different purposes by the receiving terminal, including channel-state information reference signals (CSI-RS) and demodulation reference signals (DM-RS, or DMRS, without the hyphen).

In NR, the orthogonal frequency-division multiplexing (OFDM) waveform is used for both downlink and uplink transmissions. The transmit signals in an OFDM system can have high peak values in the time domain, because the many subcarrier components are added via an iFFT (inverse Fast Fourier Transform) operation. As a result, OFDM systems are known to have a high PAPR (Peak-to-Average Power Ratio), compared with single-carrier systems.

Indeed, the high PAPR is one of the most detrimental aspects in an OFDM system, as a high PAPR decreases the SQNR (Signal-to-Quantization Noise Ratio) of ADC (Analog-to-Digital Converter) and DAC (Digital-to Analog Converter) while degrading the efficiency of the power amplifier in the transmitter. For example, an increase in PAPR can result in operating a device in the saturation region of the device's power amplifier. This results in a number of issues, including that such a device cannot be operated according to specified limits.

One solution to mitigate high PAPR is use power back off, in which the power amplifier needs to be backed off by some number of decibels dBs for NR operation. However, with power back off, the coverage is reduced, while at the same time the power amplifier efficiency is reduced. Another solution to reduce the PAPR is to use clipping, where the peaks are limited. However, with clipping the transmitted Error Vector Magnitude (a measure of signal quality) is increased, and the transmitted signal is distorted, which results in reduced throughput, particularly for higher order modulation schemes such as 64QAM, and 256 QAM.

BRIEF DESCRIPTION OF THE DRAWINGS

The technology described herein is illustrated by way of example and not limited in the accompanying figures in which like reference numerals indicate similar elements and in which.

DETAILED DESCRIPTION

Briefly, one or more aspects of the technology described herein are generally directed towards avoiding repetition in reference signal sequences, because avoiding the repetition of reference signal sequences reduces PAPR (Peak-to-Average Power Ratio). Note that as described herein, it has been found that repeated reference signal sequences, with respect to the inverse Fast Fourier Transform (iFFT) computed on the OFDM symbols, increase the PAPR on a transmitting device. Conventional OFDM systems, which repeat reference signal sequences, are known to have a high PAPR compared with single-carrier systems.

In one or more implementations, the reference signal (e.g., demodulation reference signal, or DMRS) sequence generation is modified, such that the sequence depends on the index of the resource elements, thereby generating a different pseudo-random sequence for different ports. As a result of having non-repetitive sequences, the PAPR is reduced, e.g., to be close or equal to that of data. In one or more alternative implementations, the sequence generation is modified by having the sequence be based on the code division multiplexing (CDM) group of the ports, thereby avoiding the repetition of the sequence within a resource block. Again, because of the non-repetitive sequences, the PAPR is reduced.

It should be understood that any of the examples and terms used herein are non-limiting. For instance, some examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Further, examples generally refer to demodulation reference signals, however the technology described herein provides similar benefits with other types of reference signals. Thus, any of the embodiments, aspects, concepts, structures, functionalities or examples described herein are non-limiting, and the technology may be used in various ways that provide benefits and advantages in radio communications in general.

Figure 1:
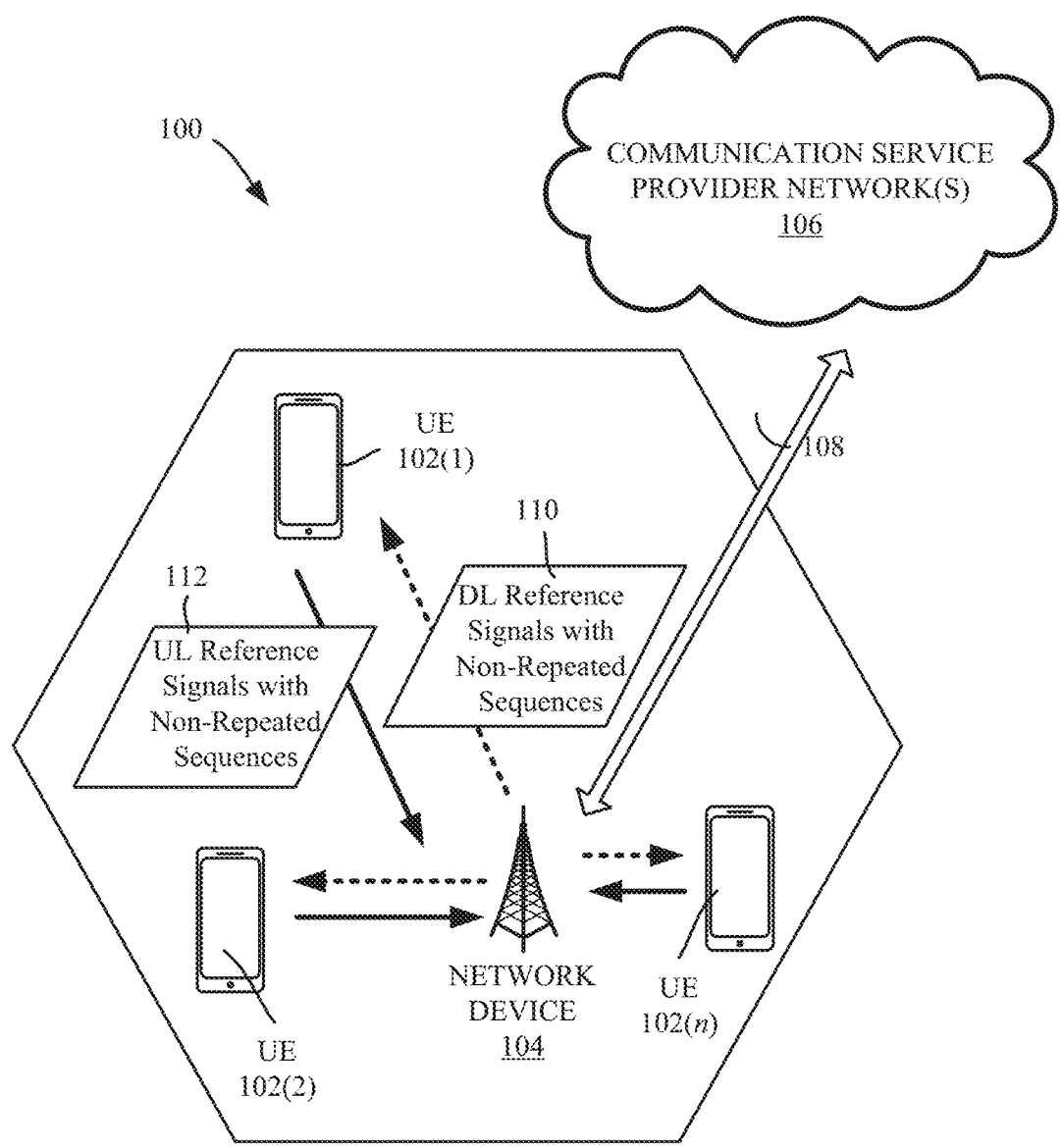
FIG. 1 illustrates an example wireless communication system in which a transmitter device of a can use non-repetitive reference signals with a receiver device to implement various aspects and implementations of the subject disclosure.

FIG. 1 illustrates an example wireless communication system 100 in accordance with various aspects and embodiments of the subject technology. In one or more embodiments, the system 100 can comprise one or more user equipment, e.g., UEs 102(1)-102(n).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE), thus providing connectivity between the UE and the wider cellular network.

In example implementations, each UE such as the UE 102(1) is able to send and/or receive communication data via a wireless link to the network device 104. The dashed arrow lines from the network device 104 to the UE 102 represent downlink (DL) communications and the solid arrow lines from the UE 102 to the network device 104 represents uplink (UL) communications.

The system 100 can further include one or more communication service provider networks 106 that facilitate providing wireless communication services to various UEs, including UES 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., a UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated, and each antenna transmits the same information. The term spatial layer refers to a data stream that includes information not included at the other layers. The rank of the transmission is equal to the number of spatial layers in an LTE spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

Note that a DMRS structure for four antenna ports (hence maximum four layers and 4 DM-RS) in NR system, for example, has reference symbols within a resource-block transmitted for a single antenna port 0; the same reference symbols are code multiplexed and transmitted on antenna port 1. Similarly, for ports 2 and 3 same resource elements are used for transmitting DMRS reference symbols, and are code multiplexed as in port 0 and 1. Further note that the resource elements used for rank 3 and rank 4 (ports 2 and 3) are orthogonal in frequency to that of port 0 and 1.

In FIG. 1, as described herein, for transmissions of reference signals, a user equipment (e.g., 102(1)) receives resource blocks comprising any suitable data structure(s) 110 that contain reference signal sequence data transmitted from the network device 104. For example, a typical 5G physical downlink shared channel (PDSCH) data resource block comprises a grid of resource elements, in which some resource elements comprise control information, other resource elements comprise demodulation reference signals (DMRS) for PDSCH demodulation, and other resource elements comprise data. Resource blocks can be used for other reference signals, e.g., including but not limited to CSI-RS (channel state information reference signals), physical downlink control channel (PDCCH) DMRS for PDCCH Demodulation, phase tracking reference signals, and tracking reference signals.

Similarly, in FIG. 1, the user equipment (e.g., 102(1)) transmits resource blocks comprising any suitable data structure(s) 112 that contain reference signal sequence data transmitted to and received by the network device 104. Thus, as used herein, a resource block refers to any suitable data structure with data (resource elements) therein, and reference signals can be any type of downlink or uplink reference signals.

As described herein, the reference signal sequences transmitted from a transmitting device, e.g., the network device 104 for downlink transmissions and the user equipment 102(1) for uplink transmissions, are non-repetitive with respect to an OFDM symbol/resource block. This avoids the additive effect that occurs in the iFFT that would otherwise increase the PAPR.

More particularly, a general principle behind the technology described herein is to generate a pseudo-random sequence, e.g., one that is dependent on the resource elements used for reference signal (e.g., DMRS) transmission, so that ports 0 and 1 have one sequence that is not repeated for ports 2 and 3. This reduces the PAPR for NR communications.

In general, to generate the sequence for DMRS, for example, the user equipment assumes the demodulation reference signal sequence r(n) can be defined by $$r(n) = \frac{1}{\sqrt{2}}(1 - 2 \cdot c(2n)) + j\frac{1}{\sqrt{2}}(1 - 2 \cdot c(2n+1))$$

where the pseudo-random sequence is defined as $$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

and where $N_C = 1600$ and the first m-sequence $x_1(n)$ is initialized with $x_1(0)=1, x_i(n)=0, n=1, 2, \ldots, 30$. The initialization of the second m-sequence, $x_2(n)$, is denoted by $$c_{init} = \sum_{i=0}^{30} x_2(i) \cdot 2^i$$

wall the value depending on the application of the sequence.

The pseudo-random sequence generator is initialized with $$c_{init}=(2^{17}(N_{symb}^{slot}n_{s,f}^{\mu}+l+1)(2N_{ID}^{nSCID}+1)+2N_{ID}^{nSCID}+n_{SCID})\bmod 2^{31}$$

where l is the OFDM symbol number within the slot, and $n_{s,f}^{\mu}$ is the slot number within a frame.

Once the sequence is generated using above, the sequence is mapped to the resource elements in the OFDM time-frequency grid using the equation (conventional technique):

$$a_{k,l}^{(p,\mu)} = \beta_{PDSCH}^{DMRS} w_f(k')w_t(l')r(2n+k)$$

$$k = \begin{cases} 4n+2k'+\Delta & \text{Configuration type 1} \\ 6n+k'+\Delta & \text{Configuration type 2} \end{cases}$$

$$k' = 0, 1$$

$$l = \bar{l}+l'$$

$$n = 0, 1, ...$$

where $w_f(k')$, $w_t(l')$, $\Delta$ and $\lambda$ are given in the 3GPP standard TS 38.211 by Tables 7.4.1.1.2-1 and 7.4.1.1.2-2.

Instead of generating the same sequences, aspects of the technology described herein use resource elements' specific sequences; for example, in the above equation of resource element mapping, r(2n+k') is replaced with r(k), or a function thereof, F(r(k)) where F is a linear function in one or more implementations. In other words, the port index/resource element is used in generating the sequence (e.g., one resource element gets a sequence with the first number relative to the conventional sequence, third number, fifth number, and so on, while another resource element gets the second number, fourth number, sixth number, and so on. Significantly, PAPR is reduced because the same sequence is not repeated in the resource elements.

Figure 2A:
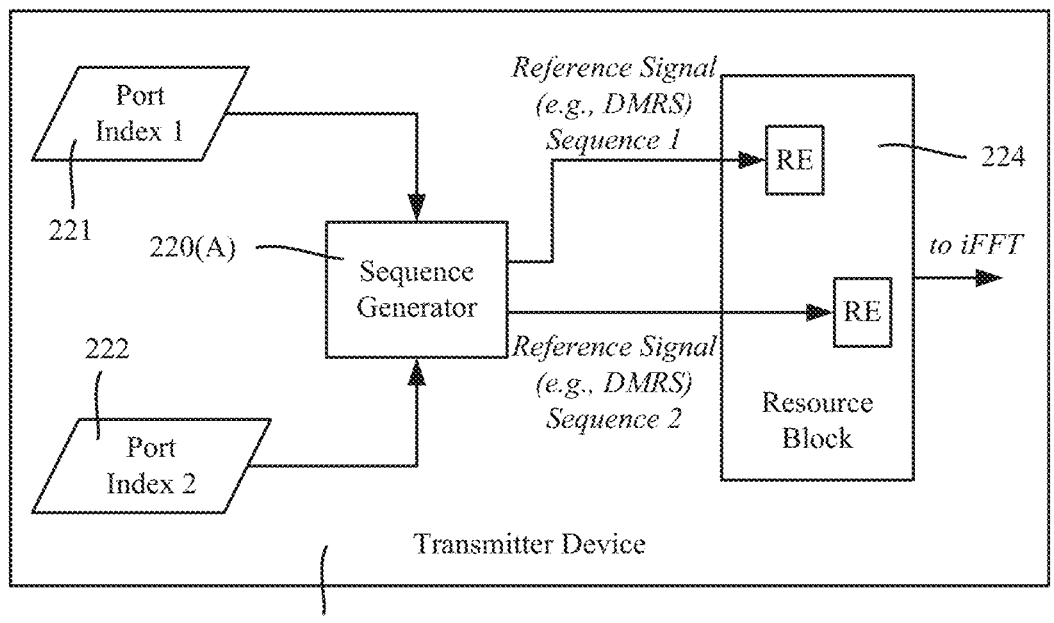
FIGS. 2A and 2B illustrate example transmitter device reference signal sequence generation, such as based on port index (FIG. 2A) and code division multiplexing (CDM) group (FIG. 2B), to avoid repetition of reference signal sequences, in accordance with various aspects and implementations of the subject disclosure.

FIG. 2A shows an example implementation of how generating the sequence in a transmitter device 218 avoids repetitions within a resource block for different ports. In FIG. 2A, a sequence generator 220(A), using r(k) or F(r(k)) generates two different sequences based on the indexes of the resource elements, e.g., one based on port index 1 221 and another based on port index 2 222, and maps them to appropriate resource elements in the resource block 224. As is understood, this is performed during mapping, before the modulating and combining of the data symbols/iFFT operation. Thus, antenna ports 0 and 1 (rank 1 and 2), corresponding to port index 1 221 have a different DMRS sequence relative to antenna ports 2 and 3 (rank 3 and 4), corresponding to port index 1 221.

Figure 2B:
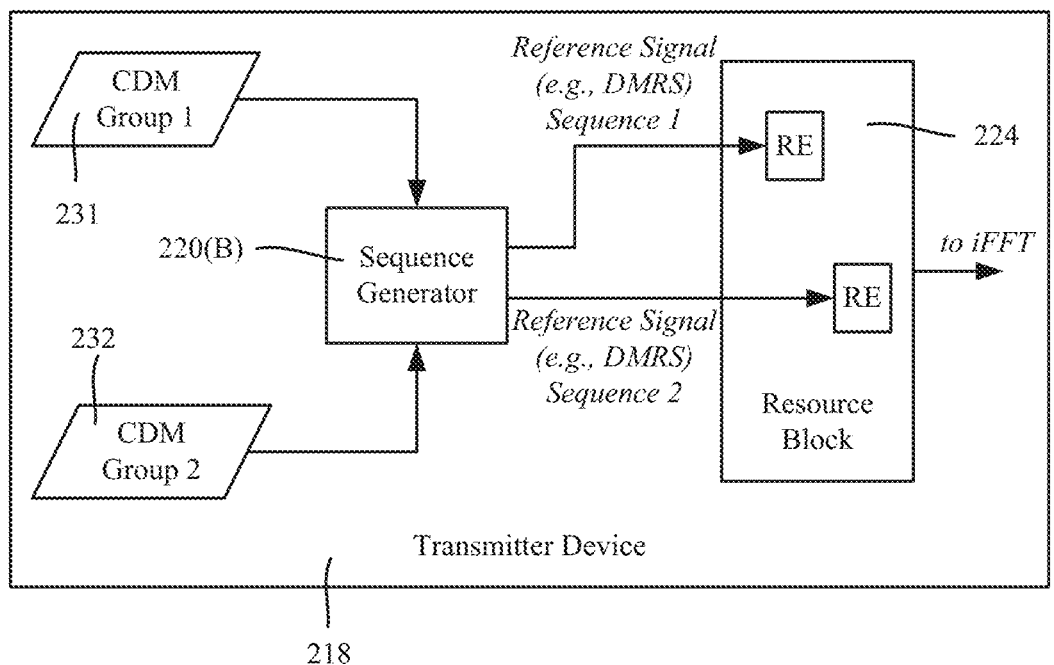

In an alternative implementation generally represented in FIG. 2B, the random sequence can be generated such that it depends on the code division multiplexing (CDM) group, that is, $c_{init}$ is based on the different CDM groups (blocks 231 and 232), thereby generating different random sequences for different CDM groups. Note that FIG. 2B is thus similar to FIG. 2A, except that in this alternative implementation, the sequence generator 220(B) uses CDM group information to generate the different reference signals for mapping to the resource elements.

It should be noted that the generation of different sequences as described herein can be turned off if appropriate. For example, if a receiver device is not capable of using the transmitted non-repetitive reference signal sequences, then a communication between the transmitter and receiver can be used to ensure that the receiver receives conventional reference signal sequences.

Figure 3:
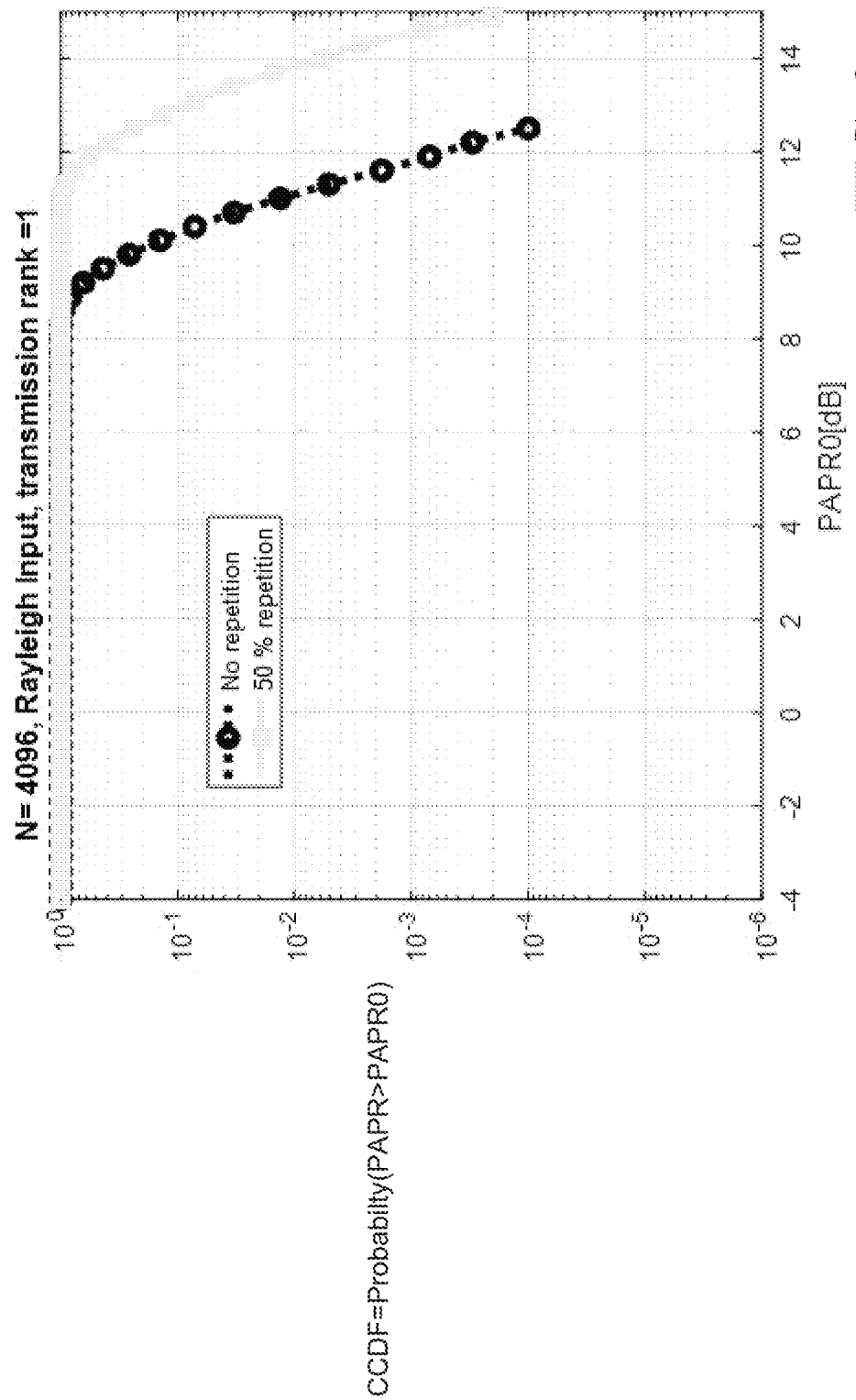
FIG. 3 is a graphical representation of a complementary, cumulative distribution function (CCDF) for peak-to-average power ratio (PAPR) with no repetition of symbols and with repetition of symbols, in accordance with various aspects and implementations of the subject disclosure.
Figure 4:
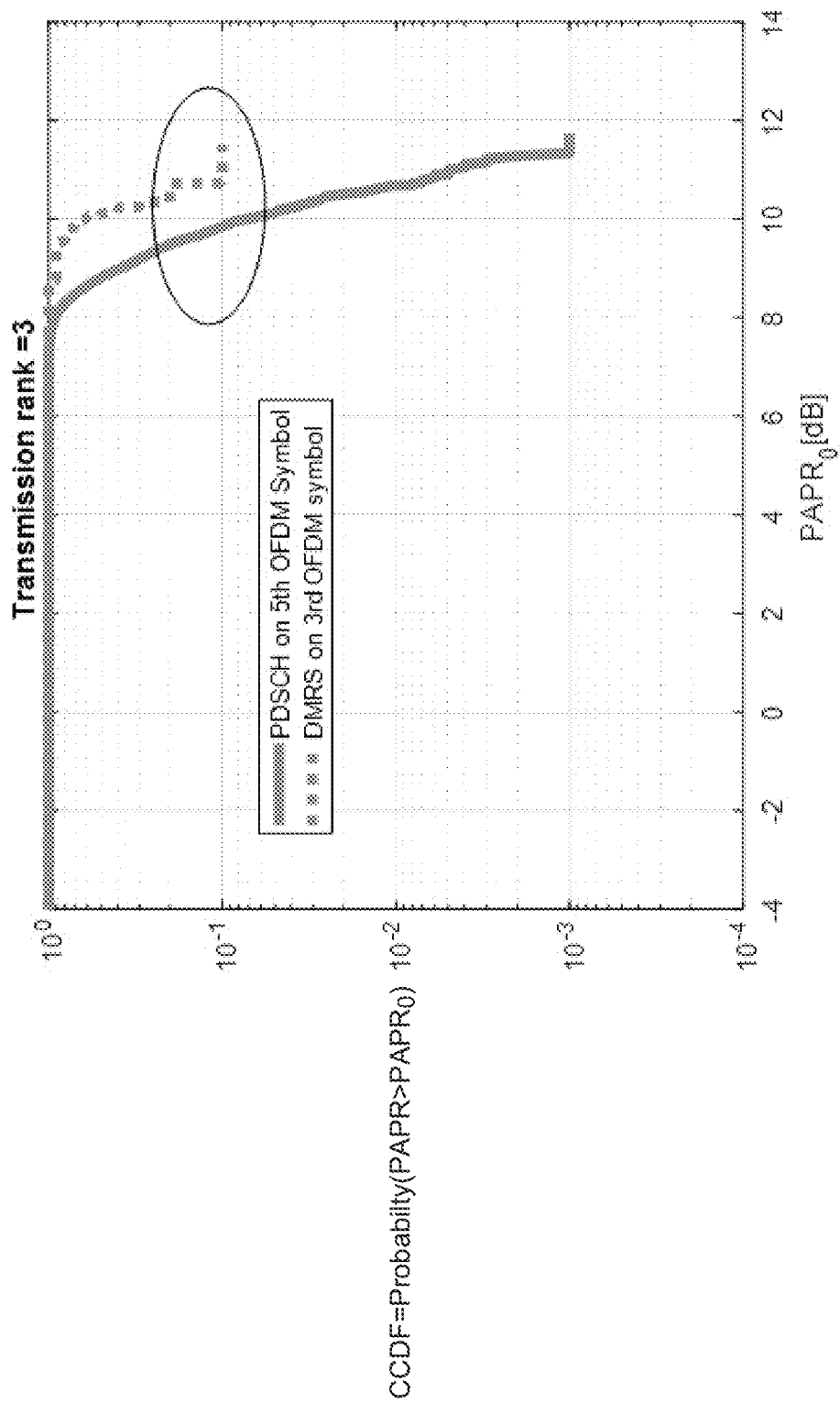
FIG. 4 is a graphical representation of CCDF versus PAPR for rank 3 transmission, in accordance with various aspects and implementations of the subject disclosure.
Figure 5:
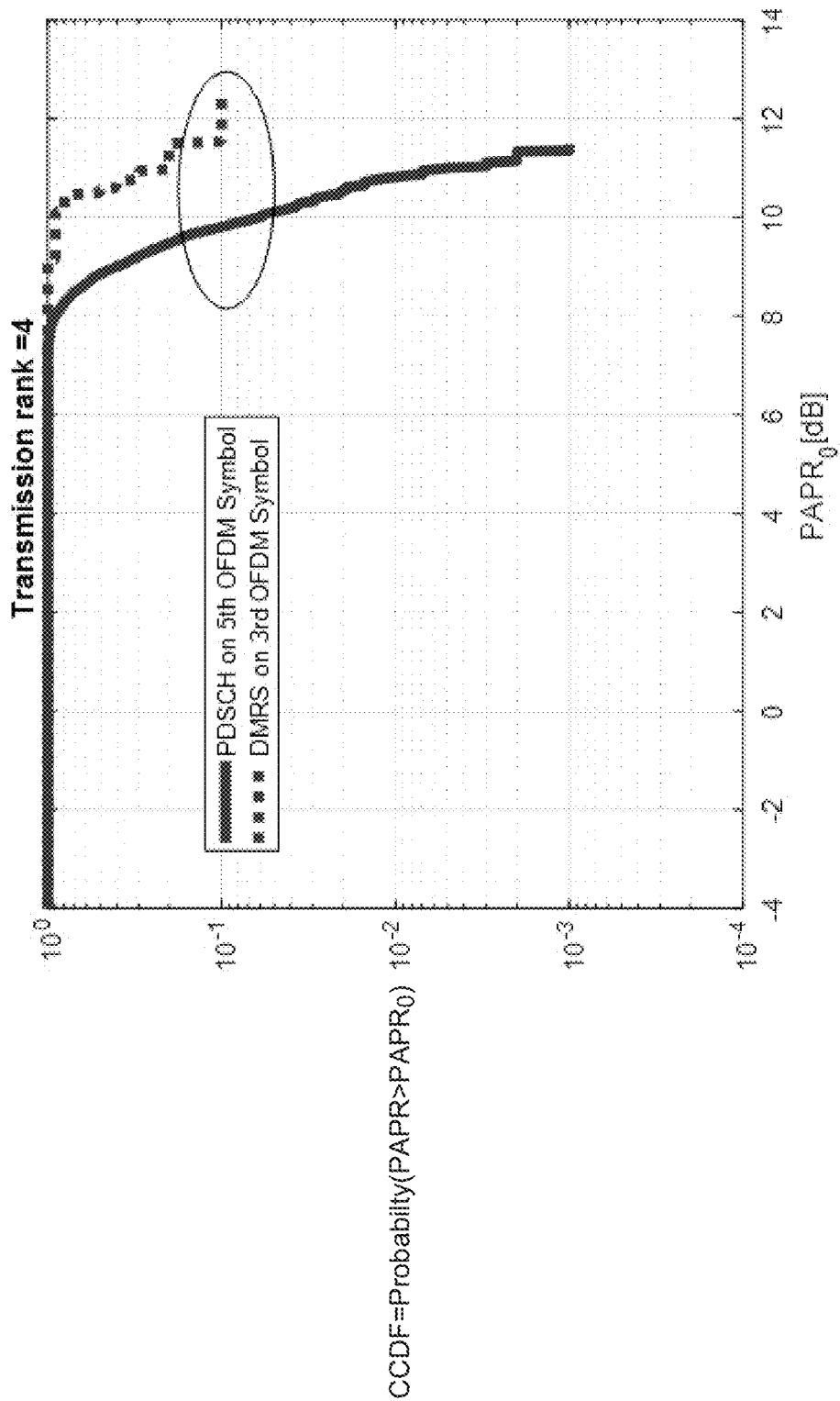
FIG. 5 is a graphical representation of CCDF versus PAPR for rank 4 transmission, in accordance with various aspects and implementations of the subject disclosure.

FIGS. 3-5 are graphical representations showing for DMRS examples how repeated symbols for ports 2 and 3 increase the PAPR. Note that CCDF refers to the complementary, cumulative distribution function, a known statistical-power calculation performed on time-domain data.

Figure 6:
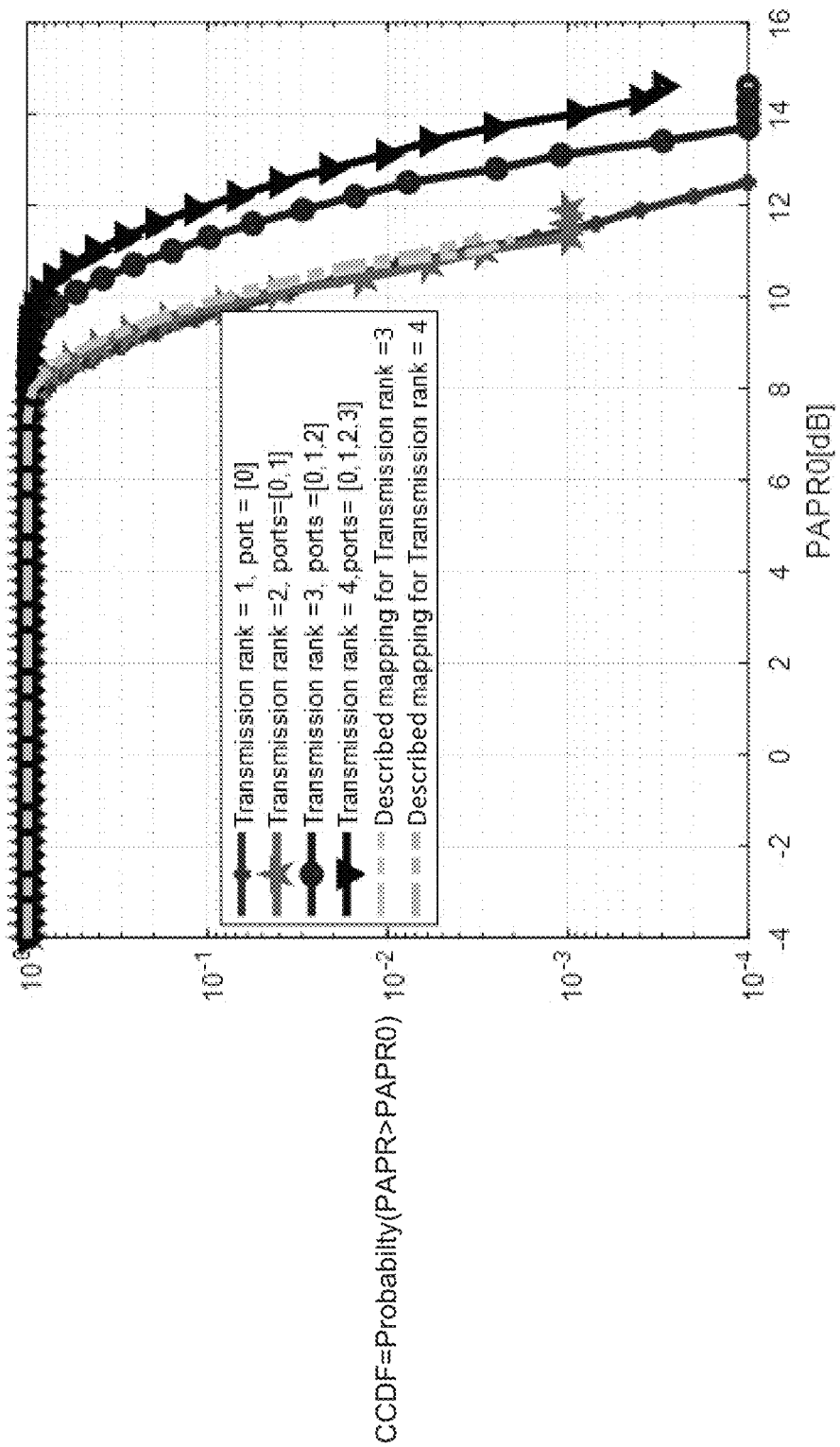
FIG. 6 is a graphical representation of CCDF versus PAPR for transmission ranks 1-4 and when using resource mapping of non-repetitive reference signals, in accordance with various aspects and implementations of the subject disclosure.

The graphical representation of FIG. 6 shows the performance with the technology described herein. As can be seen, by avoiding repetition, the PAPR is improved and is almost equal to that of data, hence the network can schedule transmission ranks more than two with less impact on the power adapter.

Figure 7:
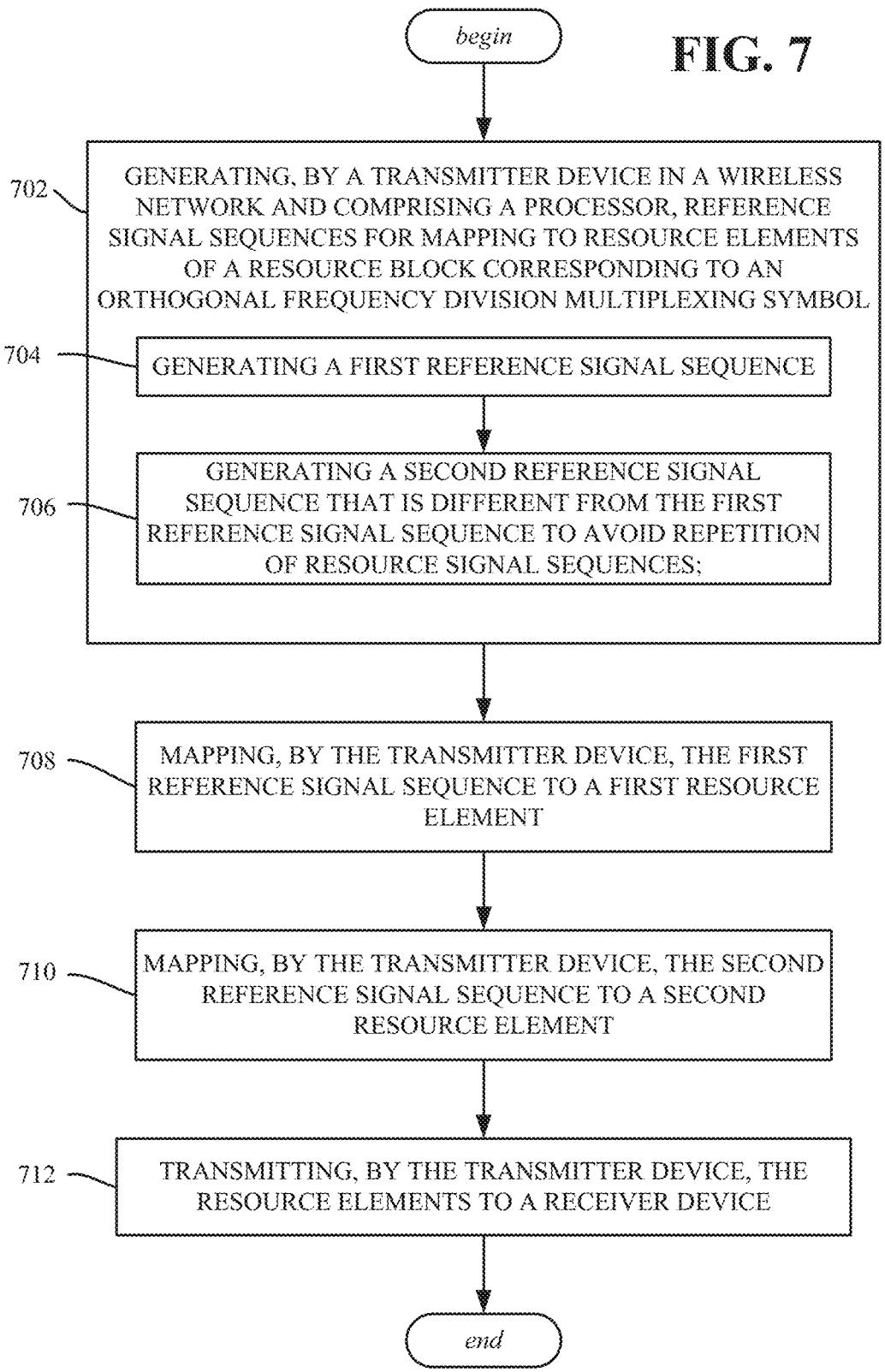
FIG. 7 illustrates a flow diagram of example operations of a transmitter device in a wireless communications system, in accordance with various aspects and implementations of the subject disclosure.

FIG. 7 summarizes various example operations of a transmitter device in a wireless network, including operation 702 which represents generating reference signal sequences for mapping to resource elements of a resource block corresponding to an orthogonal frequency division multiplexing symbol, comprising generating (operation 704) a first reference signal sequence, and generating (operation 706) a second reference signal sequence that is different from the first reference signal sequence to avoid repetition of resource signal sequences. Operation 708 represents mapping, by the transmitter device, the first reference signal sequence to a first resource element. Operation 710 represents mapping, by the transmitter device, the second reference signal sequence to a second resource element. Operation 712 represents transmitting, by the transmitter device, the resource elements to a receiver device.

Generating the first reference signal sequence can comprise pseudo-randomly generating the first reference signal sequence based on the first resource element, and generating the second reference signal sequence can comprise pseudo-randomly generating the second reference signal sequence based on the second resource element. Generating the first reference signal sequence can comprise pseudo-randomly generating the first reference signal sequence based on a first code division multiplexing group, and the generating the second reference signal sequence can comprise pseudo-randomly generating the second reference signal sequence based on a second code division multiplexing group.

Generating the first reference signal sequence can comprise pseudo-randomly generating the first reference signal sequence based on a first antenna port index, and the generating the second reference signal sequence can comprise generating the second reference signal sequence based on a second antenna port index. Generating the first reference signal sequence can comprise generating a first demodulation reference signal sequence, and wherein the generating the second reference signal sequence can comprise generating a second demodulation reference signal sequence. Generating the first reference signal sequence can comprise generating a first channel state information reference signal sequence, and wherein the generating the second reference signal sequence can comprise generating a second channel state information reference signal sequence.

The transmitter device can comprise a network device, and transmitting the resource elements to the receiver device can comprise transmitting the reference signal sequences as downlink reference signal sequences to the receiver device.

The transmitter device can comprise a user equipment, and transmitting the resource elements to the receiver device can comprise transmitting the reference signal sequences as uplink reference signal sequences to the receiver device.

Figure 8:
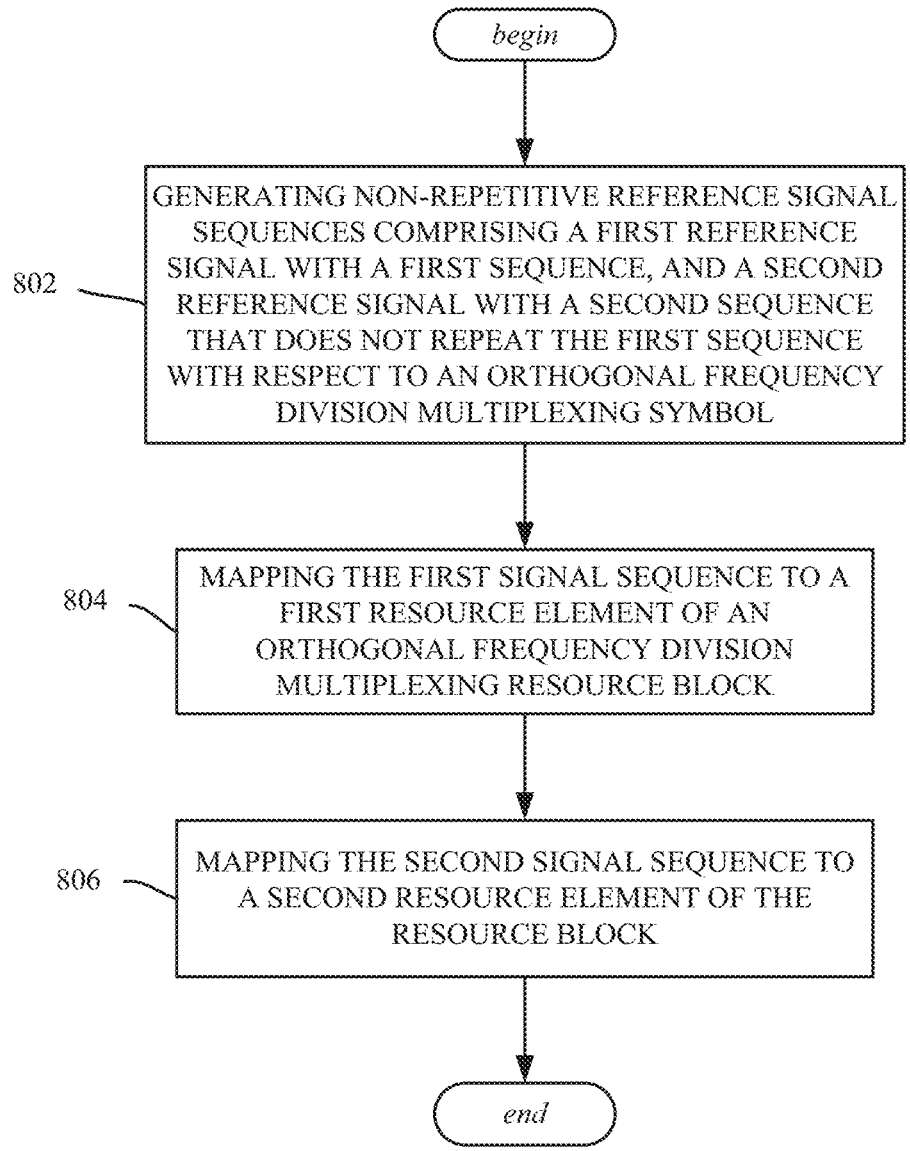
FIG. 8 illustrates a flow diagram of example operations of a wireless transmitter device, in accordance with various aspects and implementations of the subject disclosure.

FIG. 8 summarizes various example operations of a wireless communications device, e.g., comprising a processor and a memory that stores executable instructions that, when executed by the processor, facilitate performance of operations. Operation 802 represents generating non-repetitive reference signal sequences comprising a first reference signal with a first sequence, and a second reference signal with a second sequence that does not repeat the first sequence with respect to an orthogonal frequency division multiplexing symbol. Operation 804 represents mapping the first signal sequence to a first resource element of an orthogonal frequency division multiplexing resource block. Operation 806 represents mapping the second signal sequence to a second resource element of the resource block.

Further operations can comprise transmitting the first resource element and the second resource element using the orthogonal frequency division multiplexing symbol corresponding to the orthogonal frequency division multiplexing resource block.

The first reference signal with the first sequence can be based on a first port index, and wherein the second reference signal with the second sequence can be based on a second port index. The first port index can correspond to antenna port zero and antenna port one, and the second port index can correspond to antenna port two and antenna port three.

The first reference signal with the first sequence can be based on a first code division multiplexing group, and the second reference signal with the second sequence can be based on a second code division multiplexing group.

The wireless communications device can comprise a network device configured to downlink transmit the resource block to a user equipment. The wireless communications device can comprise a user equipment configured to uplink transmit the resource block to a network device.

The non-repetitive reference signal sequences can comprise demodulation reference signal sequences.

Figure 9:
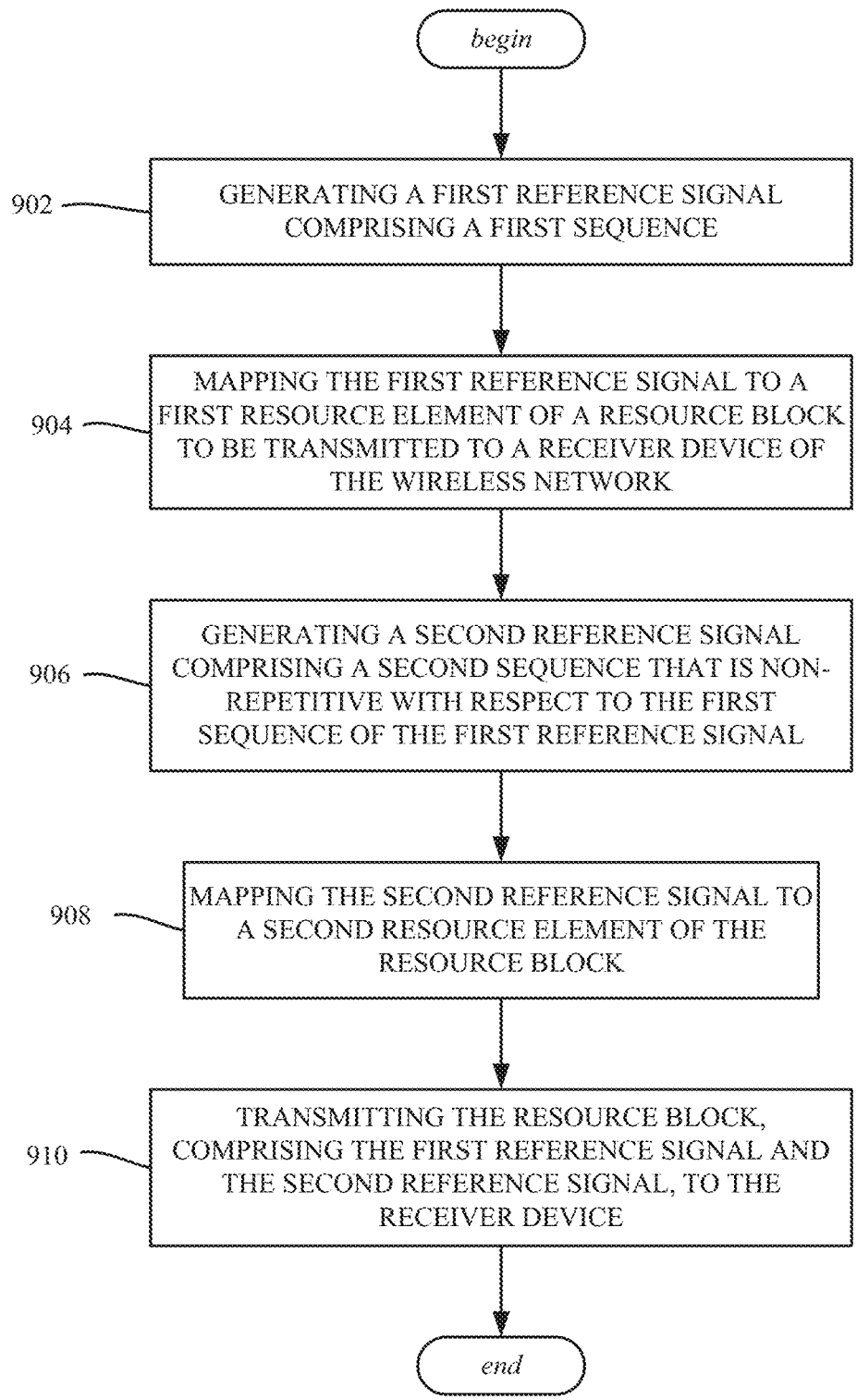
FIG. 9 illustrates a flow diagram of example operations of a transmitter device in a wireless communications system, in accordance with various aspects and implementations of the subject disclosure.

Other operations are represented in FIG. 9. Such other operations, for example, can be implemented via a machine-readable storage medium, comprising executable instructions that, when executed by a processor of a transmitting device of a wireless network, facilitate performance of the operations. Operation 902 represents generating a first reference signal comprising a first sequence. Operation 904 represents mapping the first reference signal to a first resource element of a resource block to be transmitted to a receiver device of the wireless network. Operation 906 represents generating a second reference signal comprising a second sequence that is non-repetitive with respect to the first sequence of the first reference signal. Operation 908 represents mapping the second reference signal to a second resource element of the resource block. Operation 910 represents transmitting the resource block, comprising the first reference signal and the second reference signal, to the receiver device.

Generating the second reference signal, comprising the second sequence that is non-repetitive with respect to the first sequence of the first reference signal, can comprise generating the first reference signal based on a first port index, and generating the second reference signal based on a second port index that is different from the first port index. Generating the second reference signal, comprising the second sequence that is non-repetitive with respect to the first sequence of the first reference signal, can comprise generating the first reference signal based on a first code division multiplexing group, and generating the second reference signal based on a second code division multiplexing group that is different from the first code division multiplexing group. Generating the first reference signal can comprise generating at least one of a demodulation reference signal, a channel state information reference signal, a phase tracking reference signal or a sounding reference signal.

As can be seen, there is described avoiding repetition in reference signal sequences. As a result, OFDM systems have reduced PAPR, helping to overcome certain detrimental aspects in OFDM systems, including that an increased PAPR increases the SQNR (Signal-to-Quantization Noise Ratio) of ADC (Analog-to-Digital Converter) and DAC (Digital-to Analog Converter), while degrading the efficiency of the power amplifier in the transmitter.

Figure 10:
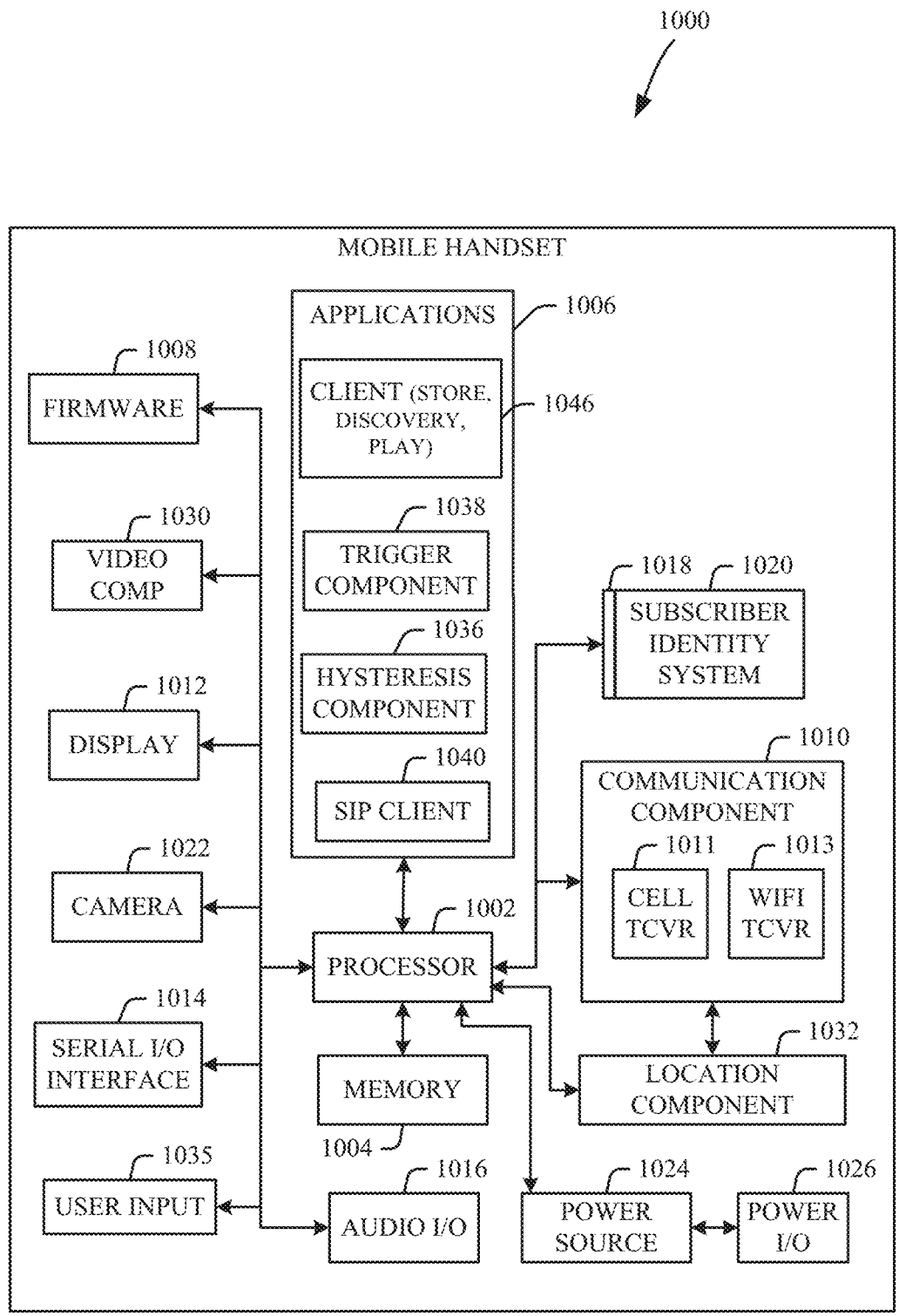
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
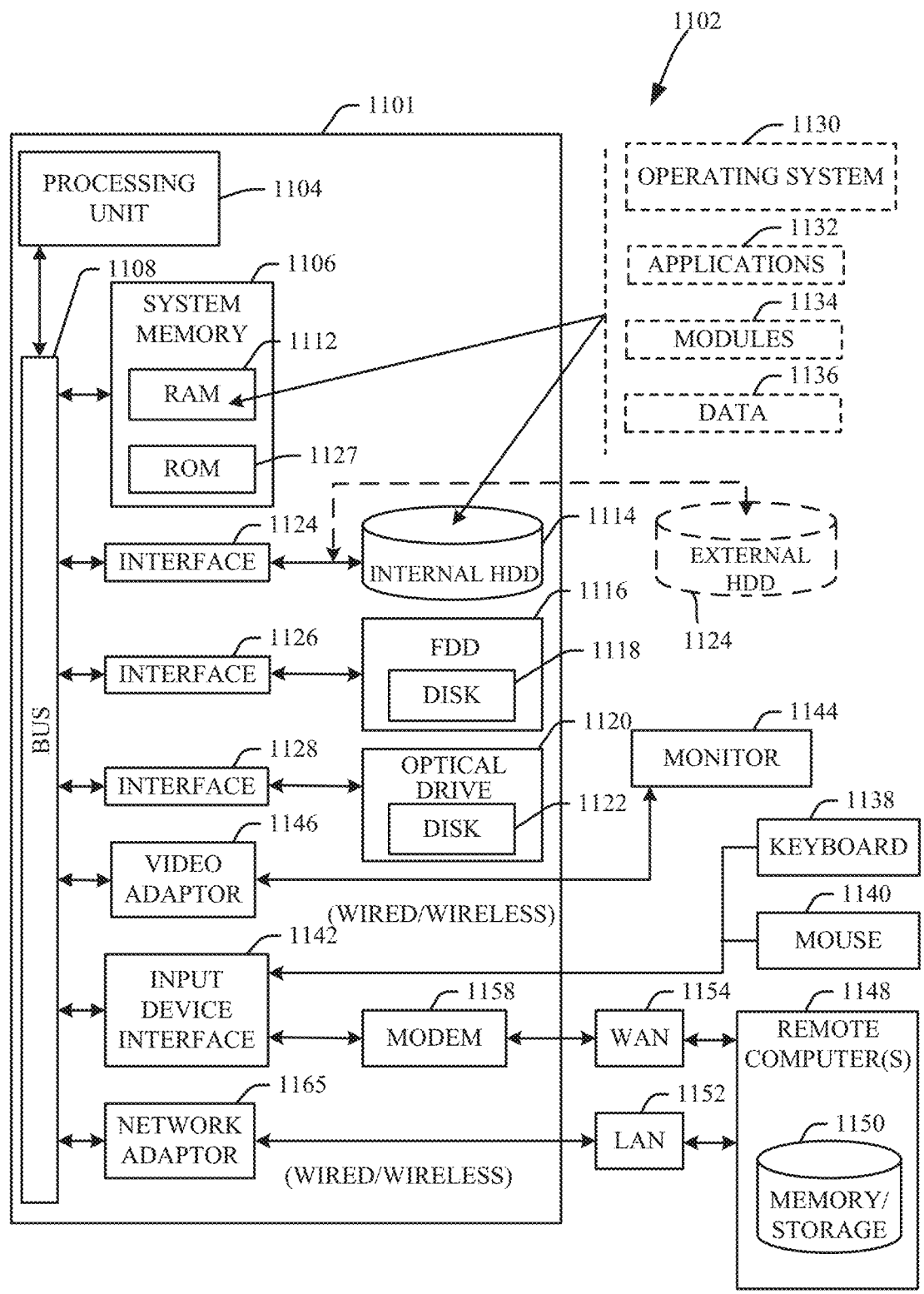
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

In order to provide a context for the various aspects of the disclosed subject matter, FIG. 11 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 1120, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1394), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, a mobile device and/or portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 and a move use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
generating, by a transmitter device in a wireless network and comprising a processor, reference signal sequences for mapping to resource elements of a resource block corresponding to an orthogonal frequency division multiplexing symbol, comprising generating a first reference signal sequence, and generating a second reference signal sequence that is different from the first reference signal sequence to avoid repetition of resource signal sequences, wherein the generating the first reference signal sequence comprises pseudo-randomly generating the first reference signal sequence based on a first antenna port index associated with a first antenna port of the transmitter device, and the generating the second reference signal sequence comprises pseudo-randomly generating the second reference signal sequence based on a second antenna port index associated with a second antenna port of the transmitter device, and wherein the reference signal sequences are non repetitive within the resource block for the first antenna port and the second antenna port in order to reduce a Peak-to-Average Power Ratio of the transmitter device;

mapping, by the transmitter device, the first reference signal sequence to a first resource element of the resource elements;

mapping, by the transmitter device, the second reference signal sequence to a second resource element of the resource elements; and transmitting, by the transmitter device, the resource elements to a receiver device based on the mappings.

2. The method of claim 1, wherein the generating the first reference signal sequence is further based on the first resource element, and the generating the second reference signal sequence is further based on the second resource element.

3. The method of claim 1, wherein the generating the first reference signal sequence is further based on a first code division multiplexing group, and the generating the second reference signal sequence is further based on a second code division multiplexing group.

4. The method of claim 1, wherein the generating the first reference signal sequence comprises generating a first demodulation reference signal sequence, and wherein the generating the second reference signal sequence comprises generating a second demodulation reference signal sequence.

5. The method of claim 1, wherein the generating the first reference signal sequence comprises generating a first channel state information reference signal sequence, and wherein the generating the second reference signal sequence comprises generating a second channel state information reference signal sequence.

6. The method of claim 1, wherein the transmitter device comprises a network device, and wherein the transmitting the resource elements to the receiver device comprises transmitting the reference signal sequences as downlink reference signal sequences to the receiver device.

7. The method of claim 1, wherein the transmitter device comprises a user equipment, and wherein the transmitting the resource elements to the receiver device comprises transmitting the reference signal sequences as uplink reference signal sequences to the receiver device.

8. A wireless communications device, comprising:
a processor; and
a memory that stores executable instructions that, when executed by the processor, facilitate performance of operations, the operations comprising:
generating non-repetitive reference signal sequences comprising a first reference signal with a first sequence, and a second reference signal with a second sequence that does not repeat the first sequence with respect to an orthogonal frequency division multiplexing symbol, wherein the first reference signal with the first sequence is generated pseudo-randomly based on a first port index associated with a first port of the wireless communications device, and the second reference signal sequence with the second sequence is generated pseudo-randomly based on a second port index associated with a second port of the wireless communications device, and wherein the reference signal sequences are non repetitive within an orthogonal frequency division multiplexing resource block for the first port and the second port in order to reduce a Peak-to-Average Power Ratio of the wireless communications device;
mapping the first reference signal with the first sequence to a first resource element of an orthogonal frequency division multiplexing resource block;
mapping the second reference signal with the second sequence to a second resource element of the orthogonal frequency division multiplexing resource block; and
transmitting the resource elements to a receiver device according to the mappings.

9. The wireless communications device of claim 8, wherein the transmitting comprises transmitting the first resource element and the second resource element using the orthogonal frequency division multiplexing symbol corresponding to the orthogonal frequency division multiplexing resource block.

10. The wireless communications device of claim 8, wherein the first reference signal with the first sequence is generated further based on a first code division multiplexing group, and wherein the second reference signal with the second sequence is generated further based on a second code division multiplexing group.

11. The wireless communications device of claim 10, wherein the first port index is further associated with a third port of the wireless communications device, and wherein the second port index is further associated with a fourth port of the wireless communications device.

12. The wireless communications device of claim 8, wherein the first reference signal with the first sequence is generated based on the first resource element, and wherein the second reference signal with the second sequence is generated based on the second resource element.

13. The wireless communications device of claim 8, wherein the wireless communications device comprises a network device configured to downlink transmit the resource block to a user equipment.

14. The wireless communications device of claim 8, wherein the wireless communications device comprises a user equipment configured to uplink transmit the resource block to a network device.

15. The wireless communications device of claim 8, wherein the non-repetitive reference signal sequences comprise demodulation reference signal sequences.

16. A non-transitory machine-readable medium, comprising executable instructions that, when executed by a processor of a transmitting device of a wireless network, facilitate performance of operations, the operations comprising:
generating a first reference signal comprising pseudo-randomly generating a first sequence based on a first port index associated with a first port of the transmitting device;
mapping the first reference signal to a first resource element of a resource block to be transmitted to a receiver device of the wireless network;
generating a second reference signal comprising pseudo-randomly generating a second sequence that is non-repetitive with respect to the first sequence of the first reference signal based on a second port index associated with a second port of the transmitting device;
mapping the second reference signal to a second resource element of the resource block, wherein the first reference signal sequence and the second reference signal are non repetitive within the resource block for the first port and the second port in order to reduce a Peak-to-Average Power Ratio of the transmitting device; and
transmitting the resource block, comprising the first reference signal and the second reference signal, to the receiver device.

17. The non-transitory machine-readable medium of claim 16, wherein the generating the second reference signal comprising the second sequence that is non-repetitive with respect to the first sequence of the first reference signal comprises generating the first reference signal further based on the first resource element, and generating the second reference signal based on the second resource element.

18. The non-transitory machine-readable medium of claim 16, wherein the generating the second reference signal comprising the second sequence that is non-repetitive with respect to the first sequence of the first reference signal comprises generating the first reference signal based on a first code division multiplexing group, and generating the second reference signal based on a second code division multiplexing group that is different from the first code division multiplexing group.

19. The non-transitory machine-readable medium of claim 16, wherein the generating the first reference signal comprises generating at least one of: a demodulation reference signal, a channel state information reference signal, a phase tracking reference signal or a sounding reference signal.

20. The non-transitory machine-readable medium of claim 16, wherein the first port index is further associated with a third port of the transmitting device, and the second port index is further associated with a fourth port of the transmitting device.

* * * * *